(12) United States Patent
Chandrasekaran et al.

(10) Patent No.: US 12,073,246 B2
(45) Date of Patent: Aug. 27, 2024

(54) DATA CURATION WITH SYNTHETIC DATA GENERATION

(71) Applicant: SAP SE, Walldorf (DE)

(72) Inventors: Vengateswaran Chandrasekaran, Trichy (IN); Manan Dhyani, Mumbai (IN); Amit Joshi, Bengaluru (IN); Sriram Narasimhan, Pleasanton, CA (US); Vinay Santurkar, Santa Clara, CA (US)

(73) Assignee: SAP SE, Walldorf (DE)

( * ) Notice: Subject to any disclaimer, the term of this patent is extended or adjusted under 35 U.S.C. 154(b) by 537 days.

(21) Appl. No.: 17/358,979

(22) Filed: Jun. 25, 2021

(65) Prior Publication Data

US 2022/0413905 A1 Dec. 29, 2022

(51) Int. Cl.
*G06F 3/00* (2006.01)
*G06F 9/48* (2006.01)
*G06F 16/23* (2019.01)

(52) U.S. Cl.
CPC ........ *G06F 9/4881* (2013.01); *G06F 16/2365* (2019.01)

(58) Field of Classification Search
CPC ..................................................... G06F 9/455
See application file for complete search history.

(56) References Cited

U.S. PATENT DOCUMENTS

| 8,429,179 B1* | 4/2013 | Mirhaji | G06F 16/3329 707/756 |
| 10,031,682 B1* | 7/2018 | George | G06F 3/0647 |
| 11,144,580 B1* | 10/2021 | Ben-Natan | G06F 16/221 |
| 2004/0193952 A1* | 9/2004 | Narayanan | G06F 16/273 714/13 |
| 2010/0114926 A1* | 5/2010 | Agrawal | G06Q 10/06 707/E17.014 |
| 2013/0117253 A1* | 5/2013 | Wang | G06F 16/972 707/E17.108 |
| 2013/0124467 A1* | 5/2013 | Naidu | G06F 16/22 707/610 |

(Continued)

OTHER PUBLICATIONS

Dirk Bartels, The Object Database Standard: ODMG 2.0. (Year: 2000).*

(Continued)

*Primary Examiner* — Lechi Truong
(74) *Attorney, Agent, or Firm* — Mintz Levin Cohn Ferris Glovsky and Popeo, P.C.

(57) ABSTRACT

A method may include identifying an identifier field included in a first datatype of a seed data sample associated with a source system. The identifier field may store a first value that enables a differentiation between different instances of the first datatype. A relationship field, which stores a second value that define a relationship between the first datatype and a second data type, may be identified. A synthetic data sample may be generated by populating the identifier field of the synthetic data sample with a synthetically generated value and the relationship field of the synthetic data sample with the second value. The synthetic data sample may be sent to a target system to enable a performance of a task at the target system. The synthetic data sample may supplement a volume and/or a diversity of the data that occurs organically at the source system.

18 Claims, 8 Drawing Sheets

(56) References Cited

U.S. PATENT DOCUMENTS

| | | | |
|---|---|---|---|
| 2015/0356094 A1* | 12/2015 | Gorelik | G06F 16/2457 |
| | | | 707/748 |
| 2016/0048517 A1* | 2/2016 | Jensen | G06F 16/245 |
| | | | 707/758 |
| 2018/0210950 A1* | 7/2018 | Zuckerman | G06F 16/288 |
| 2019/0108449 A1* | 4/2019 | Johnson | G06F 16/2246 |
| 2021/0010953 A1* | 1/2021 | Adler | G01T 1/20 |
| 2021/0200780 A1* | 7/2021 | Puvvada | G06F 16/2282 |
| 2021/0400071 A1* | 12/2021 | Ray | H04L 63/1441 |

OTHER PUBLICATIONS

Freddy Lecue, OptiqueVQS: a Visual Query System over Ontologies for Industry 1. (Year: 2018).*

* cited by examiner

DATA CURATION WITH SYNTHETIC DATA GENERATION

TECHNICAL FIELD

The subject matter described herein relates generally to data curation and more specifically to a data curation system with features for generating synthetic data.

BACKGROUND

A data lake is a type of data repository configured to store data in a natural or raw format such as, for example, files, binary large objects (BLOBs), and/or the like. Data stored in the data lake may be made available for a variety of applications including, for example, reporting, visualization, advanced analytics, and machine learning. For example, data from the data lake may be used to as training data for training one or more machine learning models to perform a variety of cognitive tasks such as object identification, natural language processing, information retrieval, and speech recognition. A deep learning model such as, for example, a neural network, may be trained to perform a classification task by at least assigning input samples to one or more categories. The deep learning model may be trained based on training data, which may include data from the data lake that has been labeled in accordance with the known category membership of each sample included in the training data. Alternatively and/or additionally, data from the data lake may be used to train the deep learning model to perform a regression task in which the deep learning model predicts, based at least on variations in one or more independent variables, corresponding changes in one or more dependent variables.

SUMMARY

Systems, methods, and articles of manufacture, including computer program products, are provided for generating synthetic data. In some example embodiments, there is provided a system that includes at least one processor and at least one memory. The at least one memory may include program code that provides operations when executed by the at least one processor. The operations may include: identifying an identifier field included in a first datatype of a seed data sample associated with a source system, the identifier field storing a first value that enables a differentiation between different instances of the first datatype; identifying a relationship field included in the first datatype of the seed data sample, the relationship field storing a second value that define a relationship between the first datatype of the seed data sample and a second data type; generating, based at least on the seed data sample, a first synthetic data sample, the generating includes populating the identifier field of first synthetic data sample with a first synthetically generated value and the relationship field of the first synthetic data sample with the second value; and sending, to a target system, the first synthetic data sample to enable a performance of a task at the target system.

In some variations, one or more features disclosed herein including the following features can optionally be included in any feasible combination. In response to determining that the first datatype is a parent datatype of a second datatype. A change corresponding to the first synthetically generated value populating the identifier field of the first synthetic data sample may be propagated to the second synthetic sample of the second datatype.

In some variations, in response to determining that the first datatype is a child datatype of a second datatype, a change corresponding to a second synthetically generated value populating the identifier field of a second synthetic data sample of the second datatype may be propagated to the identifier field of the first synthetic data sample.

In some variations, the first synthetic data sample may be sent to the target system by at least pushing the first synthetic data sample to an event stream providing a constant flow of data to the target system.

In some variations, the first synthetic data sample may be sent to the target system by at least pushing the first synthetic data sample to a local file store at the target system.

In some variations, the first synthetic data sample may be sent to the target system by at least pushing the first synthetic data sample to a raw data store at a data lake platform where the first synthetic data sample undergoes an extract, transform, and load (ETL) process before being ingested by the target system.

In some variations, the first synthetic data sample may be converted from a first format to a second format. The first synthetic sample in the second format may be sent to the target system.

In some variations, the first format may include a data-interchange format. The second format may include a column-oriented data storage format.

In some variations, the first format may include a JavaScript Object Notation (JSON) and/or an Extensible Markup Language (XML). The second format may include Parquet.

In some variations, the task may include reporting, visualization, analytics, and/or machine learning.

In some variations, the seed data sample may include data that occurs organically at the source system. The first synthetic data sample may be generated to supplement a volume and/or a diversity of the data at the source system.

In another aspect, there is provided a method for generating synthetic data. The method may include: identifying an identifier field included in a first datatype of a seed data sample associated with a source system, the identifier field storing a first value that enables a differentiation between different instances of the first datatype; identifying a relationship field included in the first datatype of the seed data sample, the relationship field storing a second value that define a relationship between the first datatype of the seed data sample and a second data type; generating, based at least on the seed data sample, a first synthetic data sample, the generating includes populating the identifier field of first synthetic data sample with a first synthetically generated value and the relationship field of the first synthetic data sample with the second value; and sending, to a target system, the first synthetic data sample to enable a performance of a task at the target system.

In some variations, one or more features disclosed herein including the following features can optionally be included in any feasible combination. The method may further include: in response to determining that the first datatype is a parent datatype to a second datatype, propagating, to the second synthetic data sample of the second datatype, a change corresponding to the first synthetically generated value populating the identifier field of the first synthetic data sample.

In some variations, the method may further include: in response to determining that the first datatype is a child datatype of a second datatype, propagating, to the identifier field of the first synthetic data sample, a change corresponding to a second synthetically generated value populating the identifier field of a second synthetic data sample of the second datatype.

In some variations, the first synthetic data sample may be sent to the target system by at least pushing the first synthetic data sample to an event stream providing a constant flow of data to the target system.

In some variations, the first synthetic data sample may be sent to the target system by at least pushing the first synthetic data sample to a local file store at the target system.

In some variations, the first synthetic data sample may be sent to the target system by at least pushing the first synthetic data sample to a raw data store at a data lake platform where the first synthetic data sample undergoes an extract, transform, and load (ETL) process before being ingested by the target system.

In some variations, the method may further include: converting the first synthetic data sample from a first format to a second format, the first format comprising a data-interchange format and the second format comprising a column-oriented data storage format; and sending, to the target system, the first synthetic data sample in the second format.

In another aspect, there is provided a computer program product including a non-transitory computer readable medium storing instructions. The instructions may cause operations may executed by at least one data processor. The operations may include: identifying an identifier field included in a first datatype of a seed data sample associated with a source system, the identifier field storing a first value that enables a differentiation between different instances of the first datatype; identifying a relationship field included in the first datatype of the seed data sample, the relationship field storing a second value that define a relationship between the first datatype of the seed data sample and a second data type; generating, based at least on the seed data sample, a first synthetic data sample, the generating includes populating the identifier field of first synthetic data sample with a first synthetically generated value and the relationship field of the first synthetic data sample with the second value; and sending, to a target system, the first synthetic data sample to enable a performance of a task at the target system.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Data stored in a data lake may be used for a variety of applications. For example, the data lake may ingest data from a source system before providing that data to a target system for a task such as reporting, visualization, advanced analytics, machine learning, and/or the like. The task at the target system may benefit from a diverse selection of data that may be encountered at the source system. For example, training a machine learning model at the target system with data covering a variety of datatypes and/or use cases may maximize the robustness of the machine learning model. However, a sufficiently diverse selection of data may not be occur organically at the source system. Moreover, the source system may lack adequate resources for synthesizing data covering different datatypes, uses cases, and/or the like. As such, the target system may be unable to perform the task with maximum precision, accuracy, and/or efficiency absent a diverse selection of data from the source system. This deficiency may be especially pronounced in cases where the task at the target system consumes data from multiple source systems, none of which being capable of providing a comprehensive selection of data.

In some example embodiments, a data lake platform may include a synthetic data generator (SDG) configured to generate, based at least on a seed data from a source system, additional synthetic data for consumption by a target system. The synthetic data may be generated to cover a variety of datatypes, use cases, and/or the like. Moreover, a sufficient quantity of synthetic data may be generated, for example, to satisfy the requirements of a task at the target system. For example, the synthetic data generator may generate a quantity of synthetic data required to train a machine learning model at the target system. The synthetic data may be generated based on a seed data, which may include data that occurs organically at the source system. For instance, a seed data sample may be a datatype (e.g., an entity and/or the like) having various identifier fields and relationship fields. To generate a corresponding synthetic data sample, the synthetic data generator may populate one or more of the identifier fields of the synthetic data sample with synthetically generated values whereas the relationship fields of the synthetic data sample may inherit the same values from the seed data sample. One or more synthetic data samples may be pushed to an event stream for ingestion by the target system. The availability of a large quantity of synthetic data covering a variety of datatypes and use cases may maximize the precision, accuracy, and/or efficiency of the task performed based on data from the source system.

Figure 1A:
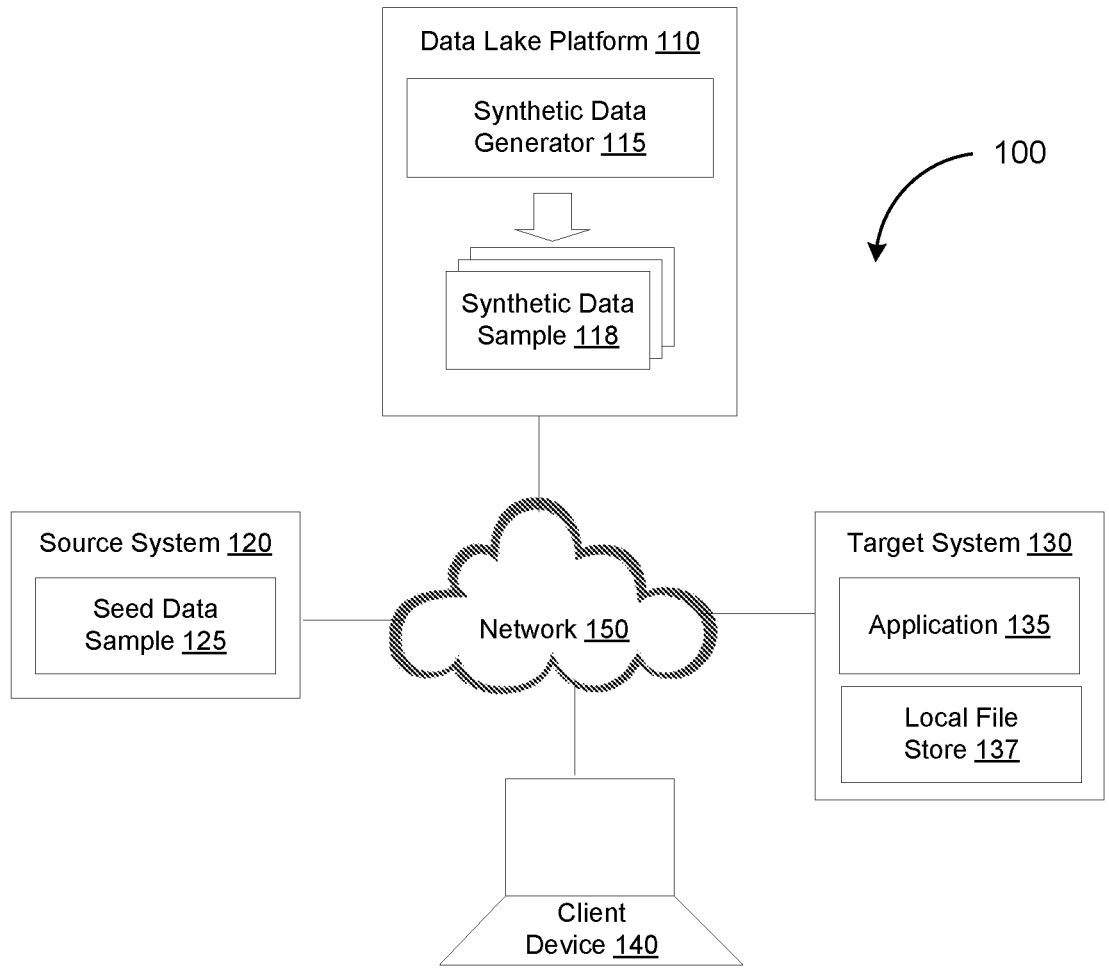
FIG. 1A depicts a system diagram illustrating an example of a data lake system, in accordance with some example embodiments.

FIG. 1A depicts a system diagram illustrating an example of a data lake system 100, in accordance with some example embodiments. Referring to FIG. 1A, the data lake system 100 may include a data lake platform 110 including a synthetic data generator 115, a source system 120, a target system 130, and a client device 140. The data lake platform 110, the source system 120, the target system 130, and the client device 140 may be communicatively coupled via a network 150. The client device 140 may be a processor-based device including, for example, a smartphone, a tablet computer, a wearable apparatus, a virtual assistant, an Internet-of-Things (IoT) appliance, and/or the like. The network 150 may be any wired network and/or a wireless network including, for example, a wide area network (WAN), a local area network (LAN), a virtual local area network (VLAN), a public land mobile network (PLMN), the Internet, and/or the like.

The data lake platform 110 may ingest data from the source system 120 and provide the data to the target system 130 for an application 135. The application 135 may be associated with one or more tasks such as, for example, reporting, visualization, advanced analytics, machine learning, and/or the like. At least a portion of the data from the source system 120 may be structured data organized in accordance with a data schema. The data schema may include, for example, metadata defining one or more datatypes including by specifying the quantity and contents of the fields forming each datatype. The metadata may further specify the various relationship that may exist between different datatypes. As such, in addition to the data from the source system 120, the metadata corresponding to the data schema of the source system 120 may also be shared with the target system 130 in order for the target system 130 to perform the one or more tasks associated with the application 135. The metadata may be associated with a variety of formats including, for example, JavaScript Object Notation (JSON), Extensible Markup Language (XML), and/or the like. Accordingly, the data schema of the source system 120 may be shared with the target system 130 by at least sending, to the target system 130, one or more documents containing the metadata, for example, in a JavaScript Object Notation (JSON) format, an Extensible Markup Language (XML) format, and/or the like.

Figure 1B:
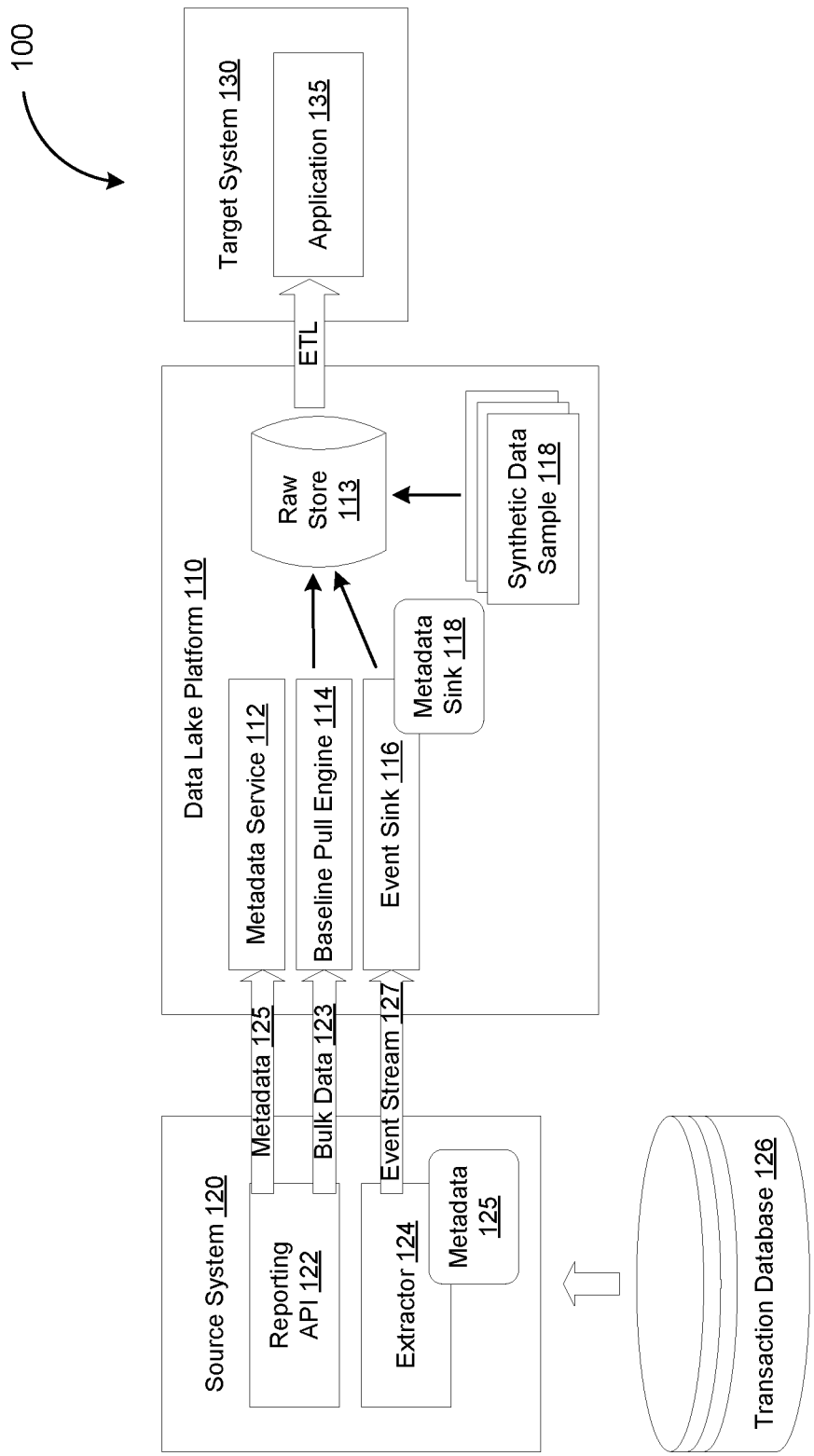
FIG. 1B depicts a schematic diagram illustrating an example of a data lake system, in accordance with some example embodiments.

FIG. 1B depicts a schematic diagram illustrating an example of the data lake system 100, in accordance with some example embodiments. Referring to FIGS. 1A-B, the source system 120 may include a reporting application programming interface (API) 122 configured to send the metadata to a metadata service 112 at the data lake platform 110 and a bulk data 123 to a baseline pull engine 114 at the data lake platform 110. Furthermore, the source system 120 may include an extractor 124 configured to send the metadata to an event sink 116 at the data platform 110. The data lake platform 110 may include a raw store 113 configured to store raw data from the baseline pull engine 114 and the event sink 116. As shown in FIG. 1B, at least a portion of the raw data from the raw store 113 may undergo an extract, transform, and load (ETL) process in order to be used by the application 135 at the target system 130.

The data lake platform 110 may, as noted, ingest data from the source system 120 before providing that data to the target system 130 for a task associated with the application 135 such as reporting, visualization, advanced analytics, machine learning, and/or the like. The task at the target system 130 may benefit from a diverse selection of data that may be encountered at the source system 120. For example, training a machine learning model at the target system 130 with data covering a variety of datatypes and/or use cases may maximize the robustness of the machine learning model. However, a sufficiently diverse selection of data may not be occur organically at the source system 120. Moreover, the source system 120 may lack adequate resources for synthesizing data covering different datatypes, uses cases, and/or the like. To increase the volume and diversity of the data available to the target system 130, the synthetic data generator 115 may be configured to generate synthetic data covering a variety of datatypes, use cases, and/or the like.

As shown in FIG. 1A, the synthetic data generator 115 may generate, based at least on a seed data sample 125 from the source system 120, one or more synthetic data samples 118 to supplement the volume and/or variety of data from the source system 120. The seed data sample 125 may include data that occurs organically at the source system 120. For instance, the seed data sample 125 may be a datatype (e.g., an entity and/or the like) having one or more identifier fields and relationship fields. To generate one or more corresponding synthetic data samples 118, the synthetic data generator 115 may populate one or more of the identifier fields of the synthetic data sample 118 with synthetically generated values whereas the relationship fields of the synthetic data sample 118 may inherit the same values from the seed data sample 125. The seed data sample 125 and the synthetic data sample 118 may be in a variety of format including, for example, JavaScript Object Notation (JSON), Extensible Markup Language (XML), and/or the like.

The one or more synthetic data samples 118 may be pushed to an event stream 127 for ingestion by the target system 130. The event stream 127 may hold streaming data (or a constant flow of data) that is processed in real time as it is delivered to the target system 130. In some cases, FIG. 1B shows that at least a portion of the synthetic data samples 118 generated by the synthetic data generator 115 may be held in the raw store 113 before undergoing an extract, transform, and load (ETL) process for subsequent use by the application 135 at the target system 130. Alternatively, for direct ingestion by the target system 130, the one or more synthetic data samples 118 may be pushed to a local file store 137 at the target system 130.

In some example embodiments, to generate the one or more synthetic data samples 118, the synthetic data generator 115 may identify one or more identifier fields and/or relationship fields included in the datatype of the seed data sample 125. As used herein, the term "identifier field" may refer to a data field storing values that are unique to each instance of a datatype. For example, the values in an identifier field of a datatype may enable a differentiation between a first instance of the datatype and a second instance of the same datatype. Meanwhile, a "relationship field" may refer to a data field storing values that define a relationship between two different datatypes. For instance, the values in a relationship field of the datatype may specify a relationship between the datatype and one or more other datatypes. In some cases, this relationship may be a hierarchical relationship in which one datatype is a parent datatype having one or more children datatypes.

To generate the one or more synthetic data samples 118, the synthetic data generator 115 may populate one or more of the identifier fields of each synthetic data sample 118 with synthetically generated values such as, for example, a randomly generated value. The synthetic data generator 115 may further populate the relationship fields of each synthetic data sample 118 with the same values from the corresponding seed data sample 125 such that the synthetic data samples 118 retain the same relationships as the seed data sample 125. According to some example embodiments, for datatypes having a hierarchical relationship, the synthetic data generator 115 may propagate changes from parent datatypes to children datatypes in order to maintain consistency in the relationship between the parent datatypes and the children datatypes. For example, a change made to the identifier fields of the seed data sample 125 to generate the synthetic data sample 118 may be propagated to child datatypes that descend from the datatype of the seed data sample 125 and the synthetic data sample 118. Changes made to the identifier fields of parent datatypes that ascend from the datatype of the seed data sample 125 and the synthetic data sample 118 may also be propagated to the seed data sample 125 and the synthetic data sample 118.

Figure 2:
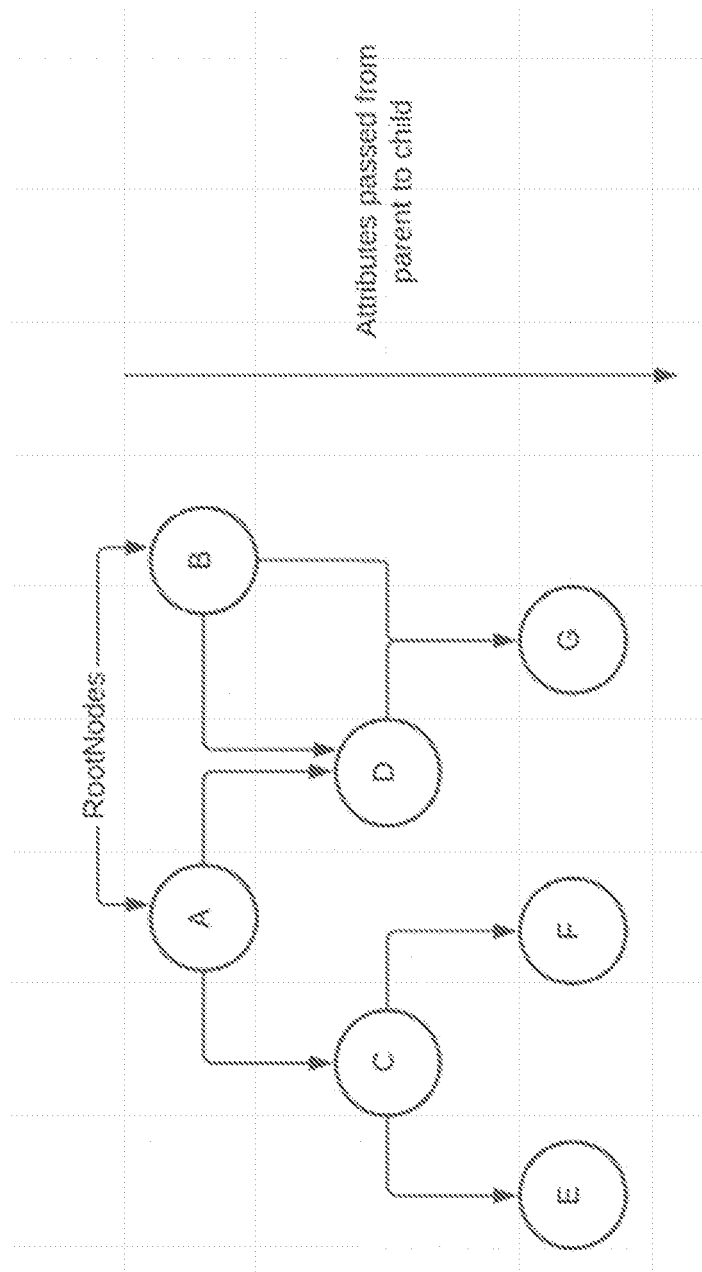
FIG. 2 depicts a topological graph illustrating an example of a datatype hierarchy, in accordance with some example embodiments.

To further illustrate, FIG. 2 depicts a topological graph illustrating an example of a datatype hierarchy 200, in accordance with some example embodiments. In the example shown in FIG. 2, Datatype A and Datatype B may form the root nodes of the datatype hierarchy 200 while Datatype C is a child datatype descendent from Datatype A and Datatype D is a child datatype descendent from Datatype A and Datatype B. Furthermore, Datatype E and Datatype F may be children datatypes that descend from Datatype C while Datatype G may be a child datatype that descends from Datatype B and Datatype D. In some example embodiments, the synthetic data generator 115 may propagate changes made to one or more identifier fields of Datatype A to Datatype C and Datatype D. These changes may be further propagated to Datatype E, Datatype F, and Datatype G. Meanwhile, changes made to the one or more identifier fields of Datatype B may be propagated to Datatype D and Datatype G.

Figure 3A:
FIG. 3A depicts a schematic diagram illustrating an example of a dataflow to a target system, in accordance with some example embodiments.
Figure 3B:
FIG. 3B depicts a schematic diagram illustrating another example of a dataflow to a target system, in accordance with some example embodiments.
Figure 3C:
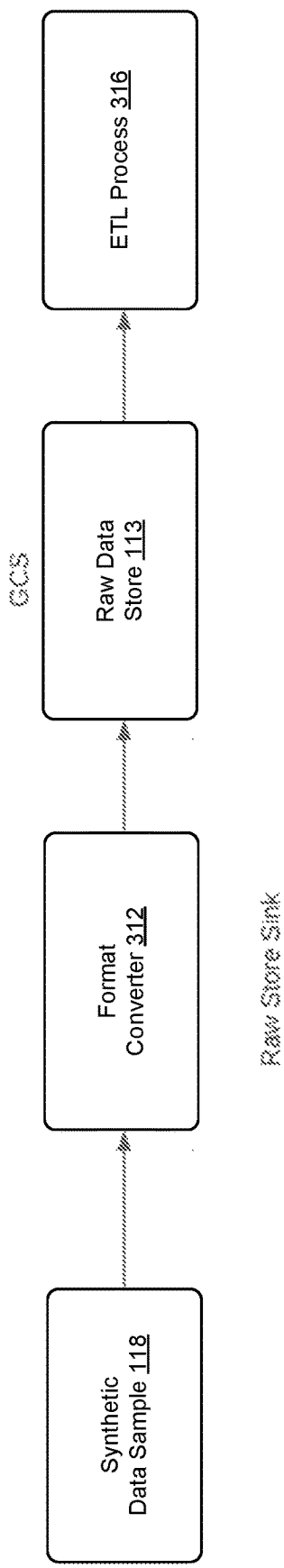
FIG. 3C depicts a schematic diagram illustrating another example of a dataflow to a target system, in accordance with some example embodiments.

In some example embodiments, the one or more synthetic data samples 118 generated by the synthetic data generator 115 may be made available to the target system 130 in a variety of manner. FIGS. 3A-C depict schematic diagrams illustrating various examples of dataflow to the target system 130. For instance, in the example shown in FIG. 3A, the synthetic data sample 118 generated by the synthetic data generator 115 may be pushed to the event stream 127 to provide, to the target system 130, a constant flow of data. As shown in FIG. 3A, the event stream 127 may act as a load generator for a microservice 310. For example, the microservice 310 may consume data from the event stream 127, such as the synthetic data sample 118, and apply at least a portion of the data towards stress testing at the target system 130. This setup for stress testing may be scaled, for example, using multiple threads.

FIG. 3B depicts another example dataflow in which the synthetic data samples 118 generated by the synthetic data generator 115 are pushed directly to the local file store 137 at the target system 130. As shown in FIG. 3B, before the synthetic data samples 118 are pushed to the local file store 137, the synthetic data samples 118 may undergo a transformation, for example, by a format converter 312, to convert the synthetic data samples 118 from a first format (e.g., a lightweight data-interchange format such as JavaScript Object Notation (JSON)) to a second format (e.g., a column-oriented data storage format such as Parquet).

FIG. 3C depicts another example dataflow in which the synthetic data samples 118 are converted, for example, by the format converter 312, from a first format (e.g., a lightweight data-interchange format such as JavaScript Object Notation (JSON)) to a second format (e.g., a column-oriented data storage format such as Parquet). The synthetic data samples 118 in the converted format may be pushed to the raw store 113 at the data lake platform 110 before undergoing an extract, transform, and load (ETL) process 316 for ingestion by the target system 130 and use by the application 135 at the target system 130.

Table 1 below depicts an example of programming code for generating synthetic data samples, such as the synthetic data sample 118, which are then pushed to an event stream, such as the event stream 127.

TABLE 1

```
{
  "realms": [
    "accAcwSap"
  ],
  "flows": [
    {
      "entities": [
        {
          "topic": "Ingestionein_1",
          "root": true,
          "broker": "localhost:9092",
          "total_records": 5,
          "parent_of": [
```

TABLE 1-continued

```
            "Invoice"
        ],
        "file_path": "/Users/i507442/Desktop/SAPDATA/User.json",
        "time_updated": "time",
        "entity_type": "User",
        "sinkType": [
            "Local",
            "Kafka",
        ],
        "attribute_to_change": [
            "UniqueName",
            "Name",
            "PasswordAdapter"
        ]
    }
    {
        "topic": "IngestionBin_1",
        "root": true,
        "broker": "localhost:9092",
        "parent_of": [
            "Invoice"
        ],
        "total_records": 5,
        "file_path": Users/1507442/Desktop/SAPDATA/5upplier.json",
        "time_updated": "time",
        "entity_type": "Supplier",
        "sinkType": (
            "Local"
        ]
        "attribute_to_change":
            "UniqueName",
            "Name"
        ]
    }
    {
        "topic": "IngestionBin_1",
        "broker": "localhost:9092",
        "total_records": 2,
        "attribute_mapping": [
            {
                "parent_attr": [
                    "BaseId",
                    "UniqueName",
                    "PasswordAdapter"
                ]
                "map_to_child_attr": "Preparer",
                "parent": "User"
            }
            {
                "parent_attr": [
                    "BaseId",
                    "UniqueName"
                ]
                "map_to_child_attr": "Supplier",
                "parent": "Supplier"
            },
        ],
        "file_path":/Users/i507442/Desktop/SAPDATA/Invoice.json,"
        "time_updated": "time",
        "entity_type": "Invoice",
        "sinkType": [
            "Local",
            "Kafka"
        ],
        "attribute_to_change": [
            "InitialUniqueName"
        ]
    }
    ]
    }
    ]
}
```

Figure 4:
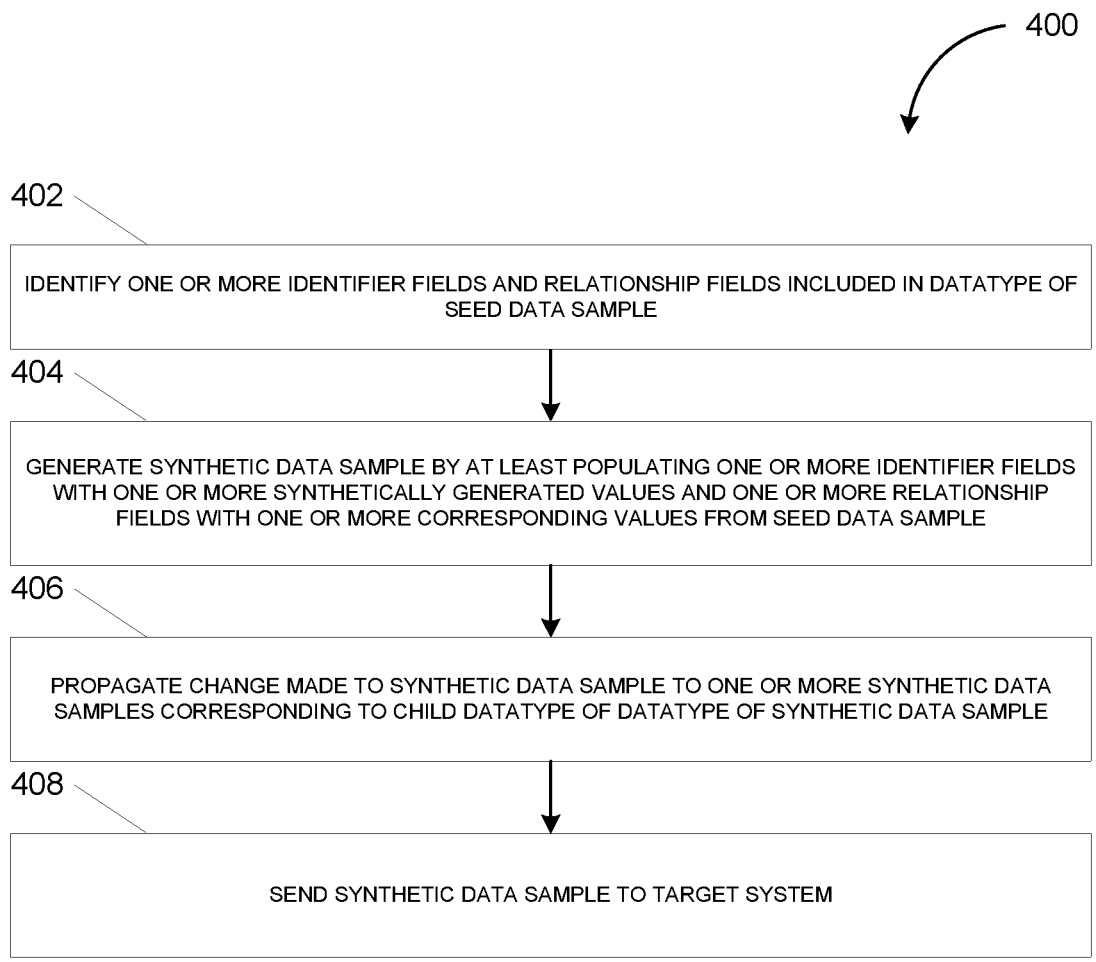
FIG. 4 depicts a flowchart illustrating an example of a process for scaling the capacity of a data lake platform, in accordance with some example embodiments.

FIG. 4 depicts a flowchart illustrating an example of a process 400 for generating synthetic data, in accordance with some example embodiments. Referring to FIGS. 1A-B, 2, 3A-C, and 4, the process 400 may be performed by the synthetic data generator 115 to generate, based at least on the seed data sample 125, one or more synthetic data samples 118 for ingestion by the target system 130.

At 402, the synthetic data generator 115 may identify one or more identifier fields and relationship fields included in a datatype of a seed data sample. In some example embodiments, an identifier field of the seed data sample 125 may be a data field storing values that are unique to each instance of a datatype associated with the seed data sample 125. For example, the values in an identifier field of the datatype associated with the seed data sample 125 may enable a differentiation between a first instance of the datatype and a second instance of the same datatype. Meanwhile, a relationship field of the seed data sample 125 may be a data field storing values that define a relationship between the datatype of the seed data sample 125 and one or more other datatypes. One example of a relationship may be a hierarchical relationship in which the datatype of the seed data sample 125 is the parent datatype or the child datatype of another datatype.

At 404, the synthetic data generator 115 may generate a synthetic data sample by at least populating the one or more identifier fields of the synthetic data sample with one or more synthetically generated values and the one or more relationship fields of the synthetic data sample with one or more corresponding values from the seed data sample. For example, the synthetic data generator 115 may generate the synthetic data sample 118 by at least populating the identifier fields of the synthetic data sample 118 with synthetically generated values such as randomly generated values. Furthermore, the synthetic data generator 115 may generate the synthetic data sample 118 by at least populating the relationship fields of the synthetic data sample 118 with the same values as the seed data sample 125. In doing so, the synthetic data sample 118 may be a variation of the seed data sample 125 that is different from the seed data sample 125 but retains the same dependency to other datatypes.

At 406, the synthetic data generator 115 may propagate a change made to the synthetic data sample to one or more synthetic data samples corresponding to a child datatype of the datatype of the synthetic data sample. For example, a change made to the identifier fields of the seed data sample 125 to generate the synthetic data sample 118 may be propagated to child datatypes that descend from the datatype of the seed data sample 125 and the synthetic data sample 118. Changes made to the identifier fields of parent datatypes that ascend from the datatype of the seed data sample 125 and the synthetic data sample 118 may also be propagated to the seed data sample 125 and the synthetic data sample 118. The synthetic data generator 115 may propagate the changes based on a datatype hierarchy, an example of which is shown in FIG. 2. The synthetic data generator 115 may propagate the changes from parent datatype to children datatypes in order to maintain consistency in the relationship between the parent datatypes and the children datatypes.

At 408, the synthetic data generator 115 may send the synthetic data sample to the target system 130. In some example embodiments, the synthetic data generator 115 may generate the one or more synthetic data samples 118 in order to supplement the volume and/or variety of data from the source system 120. The one or more synthetic data samples 118 generated by the synthetic data generator 115 may be made available to the target system 130 in a variety of manner. In one example, the synthetic data sample 118 generated by the synthetic data generator 115 may be pushed to the event stream 127 which provides, to the target system 130, a constant flow of data. Alternatively and/or additionally, the synthetic data samples 118 may first undergo a transformation, for example, by the format converter 312, in which the synthetic data samples 118 are converted from a first format (e.g., a lightweight data-interchange format such as JavaScript Object Notation (JSON) and Extensible Markup Language (XML)) to a second format (e.g., a column-oriented data storage format such as Parquet). The synthetic data samples 118 in the converted format may be pushed to the local file store 137 at the target system 130 or to the raw store 113 at the data lake platform 110 where the synthetic data samples 118 may undergo the extract, transform, and load (ETL) process 316 for ingestion by the target system 130 and use by the application 135 at the target system 130. The one or more synthetic data samples 118 may be applied toward a task at the target system 130 including, for example, reporting, visualization, advanced analytics, machine learning, and/or the like.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: identifying an identifier field included in a first datatype of a seed data sample associated with a source system, the identifier field storing a first value that enables a differentiation between different instances of the first datatype; identifying a relationship field included in the first datatype of the seed data sample, the relationship field storing a second value that define a relationship between the first datatype of the seed data sample and a second data type; generating, based at least on the seed data sample, a first synthetic data sample, the generating includes populating the identifier field of first synthetic data sample with a first synthetically generated value and the relationship field of the first synthetic data sample with the second value; and sending, to a target system, the first synthetic data sample to enable a performance of a task at the target system.

Example 2: The system of example 1, further comprising: in response to determining that the first datatype is a parent datatype to a second datatype, propagating, to the second synthetic data sample of the second datatype, a change corresponding to the first synthetically generated value populating the identifier field of the first synthetic data sample.

Example 3: The system of any one of examples 1 to 2, further comprising: in response to determining that the first datatype is a child datatype of a second datatype, propagating, to the identifier field of the first synthetic data sample, a change corresponding to a second synthetically generated value populating the identifier field of a second synthetic data sample of the second datatype.

Example 4: The system of any one of examples 1 to 3, wherein the first synthetic data sample is sent to the target system by at least pushing the first synthetic data sample to an event stream providing a constant flow of data to the target system.

Example 5: The system of any one of examples 1 to 4, wherein the first synthetic data sample is sent to the target system by at least pushing the first synthetic data sample to a local file store at the target system.

Example 6: The system of any one of examples 1 to 5, wherein the first synthetic data sample is sent to the target system by at least pushing the first synthetic data sample to a raw data store at a data lake platform where the first synthetic data sample undergoes an extract, transform, and load (ETL) process before being ingested by the target system.

Example 7: The system of any one of examples 1 to 6, further comprising: converting the first synthetic data sample from a first format to a second format; and sending, to the target system, the first synthetic data sample in the second format.

Example 8: The system of example 7, the first format comprises a data-interchange format, and wherein the second format comprises a column-oriented data storage format.

Example 9: The system of any one of examples 7 to 8, wherein the first format comprises a JavaScript Object Notation (JSON) and/or an Extensible Markup Language (XML), and wherein the second format comprises Parquet.

Example 10: The system of any one of examples 1 to 9, wherein the task at the target system includes reporting, visualization, advanced analytics, and/or machine learning.

Example 11: The system of any one of examples 1 to 10, wherein the first synthetic data sample is used to train a machine learning model to perform the task at the target system.

Example 12: The system of any one of examples 1 to 11, wherein the seed data sample comprises data that occurs organically at the source system, and wherein the first synthetic data sample is generated to supplement a volume and/or a diversity of the data at the source system.

Example 13: A computer-implemented method, comprising: identifying an identifier field included in a first datatype of a seed data sample associated with a source system, the identifier field storing a first value that enables a differentiation between different instances of the first datatype; identifying a relationship field included in the first datatype of the seed data sample, the relationship field storing a second value that define a relationship between the first datatype of the seed data sample and a second data type; generating, based at least on the seed data sample, a first synthetic data sample, the generating includes populating the identifier field of first synthetic data sample with a first synthetically generated value and the relationship field of the first synthetic data sample with the second value; and sending, to a target system, the first synthetic data sample to enable a performance of a task at the target system.

Example 14: The method of example 13, further comprising: in response to determining that the first datatype is a parent datatype to a second datatype, propagating, to the second synthetic data sample of the second datatype, a change corresponding to the first synthetically generated value populating the identifier field of the first synthetic data sample.

Example 15: The method of any one of examples 13 to 14, further comprising: in response to determining that the first datatype is a child datatype of a second datatype, propagating, to the identifier field of the first synthetic data sample, a change corresponding to a second synthetically generated value populating the identifier field of a second synthetic data sample of the second datatype.

Example 16: The method of any one of examples 13 to 15, wherein the first synthetic data sample is sent to the target system by at least pushing the first synthetic data sample to an event stream providing a constant flow of data to the target system.

Example 17: The method of any one of examples 13 to 16, wherein the first synthetic data sample is sent to the target system by at least pushing the first synthetic data sample to a local file store at the target system.

Example 18: The method of any one of examples 13 to 17, wherein the first synthetic data sample is sent to the target system by at least pushing the first synthetic data sample to a raw data store at a data lake platform where the first synthetic data sample undergoes an extract, transform, and load (ETL) process before being ingested by the target system.

Example 19: The method of any one of examples 13 to 18, further comprising: converting the first synthetic data sample from a first format to a second format, the first format comprising a data-interchange format and the second format comprising a column-oriented data storage format; and sending, to the target system, the first synthetic data sample in the second format.

Example 20: A non-transitory computer readable medium storing instructions, which when executed by at least one data processor, result in operations comprising: identifying an identifier field included in a first datatype of a seed data sample associated with a source system, the identifier field storing a first value that enables a differentiation between different instances of the first datatype; identifying a relationship field included in the first datatype of the seed data sample, the relationship field storing a second value that define a relationship between the first datatype of the seed data sample and a second data type; generating, based at least on the seed data sample, a first synthetic data sample, the generating includes populating the identifier field of first synthetic data sample with a first synthetically generated value and the relationship field of the first synthetic data sample with the second value; and sending, to a target system, the first synthetic data sample to enable a performance of a task at the target system.

Figure 5:
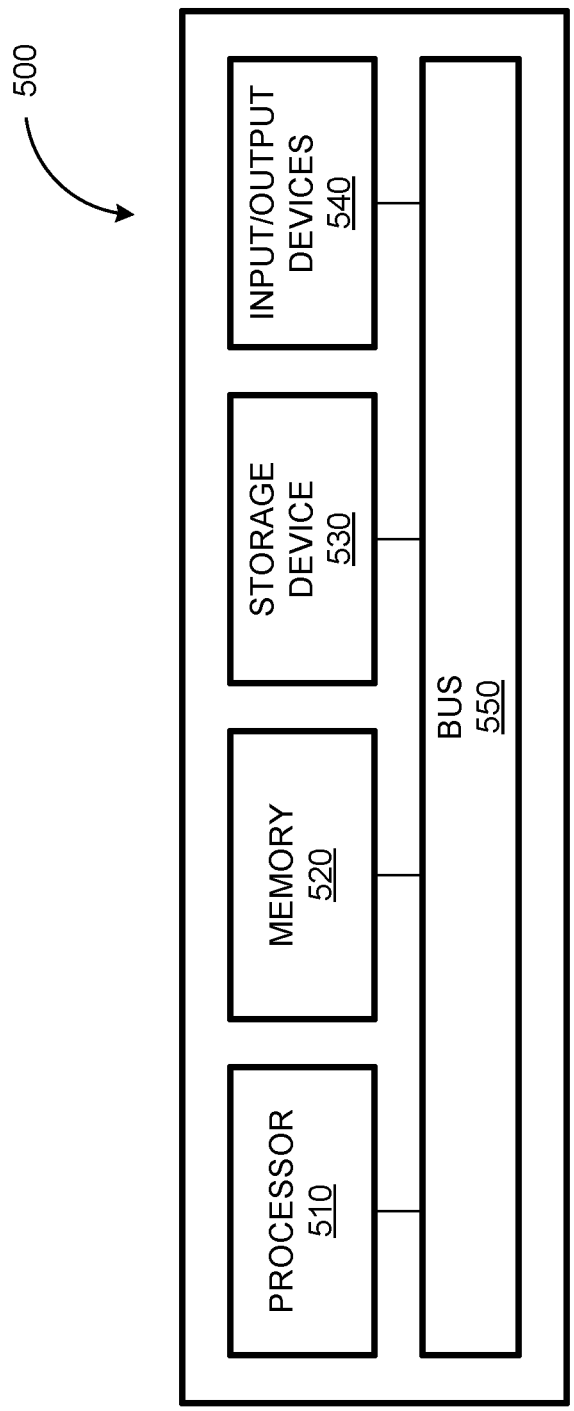
FIG. 5 depicts a block diagram illustrating a computing system, in accordance with some example embodiments; and When practical, similar reference numbers denote similar structures, features, or elements.

FIG. 5 depicts a block diagram illustrating a computing system 500, in accordance with some example embodiments. Referring to FIGS. 1A-B, 2, 3A-C, and 4-5, the computing system 500 can be used to implement the synthetic data generator 115 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the synthetic data generator 115. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
   identifying an identifier field included in a first datatype of a seed data sample associated with a source system, the identifier field storing a first value that enables a differentiation between different instances of the first datatype, wherein the seed data sample comprises data that occurs at the source system;
   identifying a relationship field included in the first datatype of the seed data sample, the relationship field storing a second value that defines a relationship between the first datatype of the seed data sample and a second datatype;
   generating, based at least on the seed data sample, a first synthetic data sample, the generating includes populating the identifier field of the first synthetic data sample with a first synthetically generated value and the relationship field of the first synthetic data sample with the second value, wherein the first synthetic data sample is generated to supplement a volume and a diversity of the data at the source system; and sending, to a target system, the first synthetic data sample to enable a performance of a task at the target system;

in response to determining that the first datatype is a parent datatype to a second datatype, propagating, to a second synthetic data sample of the second datatype, a change corresponding to the first synthetically generated value populating the identifier field of the first synthetic data sample.

2. The system of claim 1, further comprising: in response to determining that the first datatype is a child datatype of a second datatype, propagating, to the identifier field of the first synthetic data sample, a change corresponding to a second synthetically generated value populating the identifier field of a second synthetic data sample of the second datatype.

3. The system of claim 1, wherein the first synthetic data sample is sent to the target system by at least pushing the first synthetic data sample to an event stream providing a constant flow of data to the target system.

4. The system of claim 1, wherein the first synthetic data sample is a variation of the seed data sample that is different from the seed data sample but retains a same dependency to other datatypes.

5. The system of claim 1, wherein the first synthetic data sample is sent to the target system by at least pushing the first synthetic data sample to a raw data store at a data lake platform where the first synthetic data sample undergoes an extract, transform, and load (ETL) process before being ingested by the target system.

6. The system of claim 1, further comprising: converting the first synthetic data sample from a first format to a second format; and sending, to the target system, the first synthetic data sample in the second format.

7. The system of claim 6, wherein the first format comprises a data-interchange format, and wherein the second format comprises a column-oriented data storage format.

8. The system of claim 6, wherein the first format comprises a JavaScript Object Notation (JSON) and/or an Extensible Markup Language (XML), and wherein the second format comprises Parquet.

9. The system of claim 1, wherein the task includes reporting, visualization, analytics, and/or machine learning.

10. The system of claim 1, wherein the first synthetic data sample is used to train a machine learning model to perform the task at the target system.

11. The system of claim 1, wherein the first synthetically generated value is a randomly generated value.

12. A computer-implemented method, comprising:
identifying an identifier field included in a first datatype of a seed data sample associated with a source system, the identifier field storing a first value that enables a differentiation between different instances of the first datatype, wherein the seed data sample comprises data that occurs at the source system;
identifying a relationship field included in the first datatype of the seed data sample, the relationship field storing a second value that defines a relationship between the first datatype of the seed data sample and a second datatype;
generating, based at least on the seed data sample, a first synthetic data sample, the generating includes populating the identifier field of the first synthetic data sample with a first synthetically generated value and the relationship field of the first synthetic data sample with the second value, wherein the first synthetic data sample is generated to supplement a volume and a diversity of the data at the source system; and
sending, to a target system, the first synthetic data sample to enable a performance of a task at the target system;
in response to determining that the first datatype is a parent datatype to a second datatype, propagating, to a second synthetic data sample of the second datatype, a change corresponding to the first synthetically generated value populating the identifier field of the first synthetic data sample.

13. The method of claim 12, further comprising: in response to determining that the first datatype is a child datatype of a second datatype, propagating, to the identifier field of the first synthetic data sample, a change corresponding to a second synthetically generated value populating the identifier field of a second synthetic data sample of the second datatype.

14. The method of claim 12, wherein the first synthetic data sample is sent to the target system by at least pushing the first synthetic data sample to an event stream providing a constant flow of data to the target system.

15. The method of claim 12, wherein the first synthetic data sample is a variation of the seed data sample that is different from the seed data sample but retains a same dependency to other datatypes.

16. The method of claim 12, wherein the first synthetic data sample is sent to the target system by at least pushing the first synthetic data sample to a raw data store at a data lake platform where the first synthetic data sample undergoes an extract, transform, and load (ETL) process before being ingested by the target system.

17. The method of claim 12, further comprising: converting the first synthetic data sample from a first format to a second format, the first format comprising a data-interchange format and the second format comprising a column-oriented data storage format; and sending, to the target system, the first synthetic data sample in the second format.

18. A non-transitory computer readable medium storing instructions, which when executed by at least one data processor, result in operations comprising:
identifying an identifier field included in a first datatype of a seed data sample associated with a source system, the identifier field storing a first value that enables a differentiation between different instances of the first datatype, wherein the seed data sample comprises data that occurs at the source system;
identifying a relationship field included in the first datatype of the seed data sample, the relationship field storing a second value that defines a relationship between the first datatype of the seed data sample and a second datatype;
generating, based at least on the seed data sample, a first synthetic data sample, the generating includes populating the identifier field of the first synthetic data sample with a first synthetically generated value and the relationship field of the first synthetic data sample with the second value, wherein the first synthetic data sample is generated to supplement a volume and a diversity of the data at the source system; and
sending, to a target system, the first synthetic data sample to enable a performance of a task at the target system;
in response to determining that the first datatype is a parent datatype to a second datatype, propagating, to a second synthetic data sample of the second datatype, a change corresponding to the first synthetically generated value populating the identifier field of the first synthetic data sample.

* * * * *